United States Patent
Gurav et al.

(10) Patent No.: US 10,769,429 B2
(45) Date of Patent: Sep. 8, 2020

(54) METHOD AND SYSTEM FOR EXTRACTING TEXT FROM AN ENGINEERING DRAWING

(71) Applicant: Wipro Limited, Bangalore (IN)

(72) Inventors: Aniket Anand Gurav, Pune (IN); Rupesh Bapuji Wadibhasme, Pune (IN); Swapnil Dnyaneshwar Belhe, Pune (IN)

(73) Assignee: Wipro Limited, Bangalore (IN)

( * ) Notice: Subject to any disclaimer, the term of this patent is extended or adjusted under 35 U.S.C. 154(b) by 146 days.

(21) Appl. No.: 16/169,906

(22) Filed: Oct. 24, 2018

(65) Prior Publication Data
US 2020/0074171 A1    Mar. 5, 2020

(30) Foreign Application Priority Data

Aug. 31, 2018    (IN) .............................. 201841032861

(51) Int. Cl.
*G06K 9/00* (2006.01)
*G06K 9/03* (2006.01)
*G06K 9/62* (2006.01)
*G06K 9/66* (2006.01)

(52) U.S. Cl.
CPC ......... *G06K 9/00456* (2013.01); *G06K 9/033* (2013.01); *G06K 9/6212* (2013.01); *G06K 9/6284* (2013.01); *G06K 9/66* (2013.01); *G06K 2209/01* (2013.01)

(58) Field of Classification Search
CPC .. G06K 9/00456; G06K 9/033; G06K 9/6284; G06K 9/66; G06K 9/6212; G06K 2209/01
USPC ........................................................ 382/176
See application file for complete search history.

(56) References Cited

U.S. PATENT DOCUMENTS

| | | | |
|---|---|---|---|
| 5,995,659 A | 11/1999 | Chakraborty et al. | |
| 6,233,353 B1 | 5/2001 | Danisewicz | |
| 6,301,386 B1 | 10/2001 | Zhu et al. | |
| 2007/0160295 A1* | 7/2007 | Wang ................. | G06K 9/00456 382/199 |

(Continued)

OTHER PUBLICATIONS

Lu, "Detection of Text Regions From Digital Engineering Drawings", Apr. 1998, pp. 431-439, vol. 20, No. 4, IEEE.

*Primary Examiner* — Ayodeji O Ayotunde
(74) *Attorney, Agent, or Firm* — Finnegan, Henderson, Farabow, Garrett & Dunner, LLP

(57) ABSTRACT

Examples of present disclosure relate to method and system to extract text from engineering drawing for performing accurate OCR. Initially, for the extraction, image of engineering drawing is received with a plurality of components. Each of the plurality of components in the image is classified to be one of a textual component and a non-textual component. At least one word element for textual components from the plurality of components is identified based on segmentation of the plurality of components. The segmentation is performed by drawing a plurality of horizontal edge projections of a predefined length for each of the textual components. Further, the textual components is identified to be associated with the at least one word element when horizontal edge projection of each of the textual components overlaps with adjacent textual component. The at least one word element is provided as extracted text for performing OCR on the engineering drawing.

18 Claims, 7 Drawing Sheets

(56) References Cited

U.S. PATENT DOCUMENTS

| | | | |
|---|---|---|---|
| 2009/0220154 A1* | 9/2009 | Daidoh | G06K 9/346 382/182 |
| 2011/0052062 A1* | 3/2011 | Chiu | G06K 9/00456 382/176 |
| 2014/0072219 A1 | 3/2014 | Tian | |
| 2015/0052426 A1 | 2/2015 | Wu | |
| 2017/0286803 A1 | 10/2017 | Singh et al. | |

* cited by examiner

METHOD AND SYSTEM FOR EXTRACTING TEXT FROM AN ENGINEERING DRAWING

This application claims the benefit of Indian Patent Application Serial No. 201841032861, filed Aug. 31, 2018 which is hereby incorporated by reference in its entirety.

FIELD

The present subject matter is related in general to Optical Character Recognition (OCR) systems, more particularly, but not exclusively to a method and system for extracting text from engineering drawings for performing an OCR.

BACKGROUND

An engineering drawing is a type of technical drawing which may be used to define requirements for engineered items. The engineering drawing typically contains engineering diagrams and associated text components. The text components may contain important information in textual form around the engineering diagrams. The text components may be tag numbers, serial numbers, names and so on. Separating the text components from the engineering drawings is a challenging task, and such separation may differ in many aspects from non-engineering drawing documents. OCR technology is mainly used to convert virtually any kind of images containing written text into machine-readable text data. However, a system, without help of an OCR system, may not be able read the engineering drawings which are available in form of scanned images. Extraction of the textual components around the graphical symbol and non-text elements becomes difficult as filtration of only text is required before passing to the OCR system. Poor result in the OCR system may be achieved if the engineering drawings are directly passed to the OCR system, without removal of graphics or drawings. The poor performance of the OCR system on the engineering drawings may be due to lack of prior knowledge about separation of the text components and the drawing components. The OCR system may perform poorly even if the probable text candidates are marked.

One or more technologies are developed to improve the OCR system. Some technologies include extraction of the text components from the engineering drawings. Such technologies include creating a binary representation of a drawing to form an electronic image of pixels and comparing pixel values to a gray-scale threshold value and assigning the pixels to be either white or black. The image is discriminated between text regions and graphical lines in the image by determining a distance between each pixel and nearest neighboring pixels. The distance is compared with a predetermined distance and labels are assigned to the pixels which are within the predetermined distance, to group pixels into blocks. Blocks with such pixels are compared with a predetermined format to identify possible text regions. The graphical lines that remain in the text regions are removed to create text-only regions. The text is recognized within the text only regions by using OCR system.

Other technologies in the OCR system include a new rule-based method for text and graphics separation based on analysis of text and graphics features of general engineering drawings. Such approaches propose to erase non-text regions from engineering drawings as much as possible, rather than extracting text regions. Some technologies include machine learning algorithms to detect the components to be character or not.

However, such technologies include limitations on kind of engineering drawings and noise level. Also, such technologies may not be robust to the engineering drawings with varying fonts and sizes. For the engineering drawings where distance between the text components and the drawing components is minimal or zero, such technologies may provide an inaccurate output.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an example, the present disclosure relates to a method to extract text from an engineering drawing for performing OCR. Initially, for the extraction, an image of an engineering drawing is received with a plurality of components. Each of the plurality of components in the image is classified to be one of a textual component and a non-textual component. At least one word element for textual components from the plurality of components is identified based on segmentation of the plurality of components. The segmentation is performed by drawing a plurality of horizontal edge projections of a predefined length for each of the textual components. Further, the textual components is identified to be associated with the at least one word element when horizontal edge projection of each of the textual components overlaps with adjacent textual component. The at least one word element is provided as extracted text for performing OCR on the engineering drawing.

In another example, the present disclosure relates to a text extraction system to extract text from an engineering drawing for performing OCR. The text extraction system comprises a processor and a memory communicatively coupled to the processor. The memory stores processor-executable instructions, which on execution cause the processor to extract text from the engineering drawing. Initially, for the extraction, an image of an engineering drawing is received with a plurality of components. Each of the plurality of components in the image is classified to be one of a textual component and a non-textual component. At least one word element for textual components from the plurality of components is identified based on segmentation of the plurality of components. The segmentation is performed by drawing a plurality of horizontal edge projections of a predefined length for each of the textual components. Further, the textual components is identified to be associated with the at least one word element when horizontal edge projection of each of the textual components overlaps with adjacent textual component. The at least one word element is provided as extracted text for performing OCR on the engineering drawing.

In another example, the present disclosure relates to a non-transitory computer readable medium including instructions stored thereon that when processed by at least one processor cause a device to perform operations to extract text from an engineering drawing for performing OCR. Initially, for the extraction, an image of an engineering drawing is received with a plurality of components. Each of the plurality of components in the image is classified to be one of a textual component and a non-textual component. At least one word element for textual components from the plurality of components is identified based on segmentation of the plurality of components. The segmentation is performed by drawing a plurality of horizontal edge projections of a predefined length for each of the textual components. Further, the textual components is identified to be associated with the at least one word element when horizontal edge projection of each of the textual components overlaps with adjacent textual component. The at least one word element is provided as extracted text for performing OCR on the engineering drawing.

The foregoing summary is illustrative only and is not intended to be in any way limiting. In addition to the illustrative aspects, examples, and features described above, further aspects, examples, and features will become apparent by reference to the drawings and the following detailed description.

BRIEF DESCRIPTION OF THE DRAWINGS

The accompanying drawings, which are incorporated in and constitute a part of this disclosure, illustrate exemplary examples and, together with the description, serve to explain the disclosed principles. In the figures, the left-most digit(s) of a reference number identifies the figure in which the reference number first appears. The same numbers are used throughout the figures to reference like features and components. Some examples of system and/or methods in accordance with examples of the present subject matter are now described, by way of example only, and regarding the accompanying figures, in which.

Figure 1:
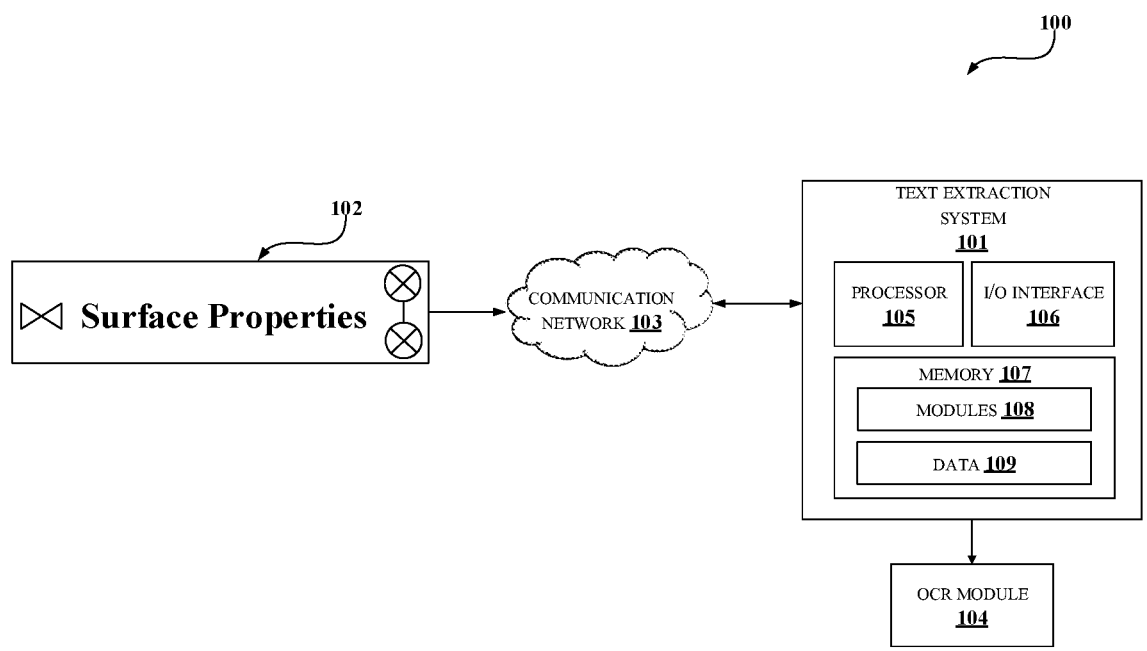
FIG. 1 shows an OCR system for extracting text from an engineering drawing for performing OCR, in accordance with some examples of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any example or implementation of the present subject matter described herein as "exemplary" is not necessarily to be construed as preferred or advantageous over other examples.

While the disclosure is susceptible to various modifications and alternative forms, specific example thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the examples of the disclosure, reference is made to the accompanying drawings that form a part hereof, and in which are shown by way of illustration specific examples in which the disclosure may be practiced. These examples are described in sufficient detail to enable those skilled in the art to practice the disclosure, and it is to be understood that other examples may be utilized and that changes may be made without departing from the scope of the present disclosure. The following description is, therefore, not to be taken in a limiting sense.

Present disclosure proposes a method and system for extracting text from an engineering drawing for performing an OCR to read textual components in the engineering drawing. By the proposed extraction of the text, accuracy of the OCR may be increased. Also, noise in input to the OCR may be reduced. The extraction is achieved by initially classifying components in the engineering drawing to be one of textual component and non-textual component. The textual components are further pre-processed to identify word elements which are provided as text for the OCR.

FIG. 1 illustrates an OCR system 100 for extracting text from an engineering drawing 102. The OCR system 100 may comprise a text extraction system 101, a communication network 103 and an OCR module 104. The illustrated engineering drawing 102 is an exemplary representation. The engineering drawing 102 may be any type of technical drawing which may be used to define requirements for engineered items. The engineering drawing 102 may contain plurality of components including non-textual components, and textual components. The OCR module 104 may be configured to perform OCR on the engineering drawing 102 to read data associated with the textual components. The text extraction system 101 may be configured to extract the text from the engineering drawing 102 by performing the steps as disclosed in the present disclosure. The extracted text is used by the OCR module 104 to read said data. In an example, the text extraction system 101 may communicate with the OCR module 104 via the communication network 103 or a dedicated communication network. In an example, the communication network 103 may include, without limitation, a direct interconnection, Local Area Network (LAN), Wide Area Network (WAN), wireless network (e.g., using Wireless Application Protocol), the Internet, and the like. In an example, the text extraction system 101 may be an integral part of the OCR module 104 (not shown in the figure).

Further, the text extraction system 101 may include a processor 105, I/O interface 106, and a memory 107. In some examples, the memory 107 may be communicatively coupled to the processor 105. The memory 107 stores instructions, executable by a processor, which, on execution, may cause the text extraction system 101 to extract the text from the engineering drawing 102, as disclosed in the present disclosure. In an example, the memory 107 may include one or more modules 108 and data 109. The one or more modules 108 may be configured to perform the steps of the present disclosure using the data 109, to extract the text. In an example, each of the one or more modules 108 may be a hardware unit which may be outside the memory 107 and coupled with the text extraction system 101. The text extraction system 101 may be implemented in a variety of computing systems, such as a laptop computer, a desktop computer, a Personal Computer (PC), a notebook, a smartphone, a tablet, e-book readers, a server, a network server, and the like.

For the extraction, initially, the text extraction system 101 may be configured to receive an image of the engineering drawing 102. In an example, the text extraction system 101 may be configured to capture the image of the engineering drawing 102. In an example, the text extraction system 101 may be coupled with an image capturing unit to capture the image of the engineering drawing 102 (not shown in the figure). The image of the engineering drawing 102 may comprise plurality of components as illustrated in FIG. 1.

Upon receiving the image, the text extraction system 101 may be configured to classify each of the plurality of components in the image to be one of a textual component and a non-textual component. In an example, the classification of each of the plurality of components may be performed using a deep learning classifier. The deep learning classifier may be trained using a plurality of predefined textual components and a plurality of predefined non-textual components. One or more techniques, known to a person skilled in the art, may be implemented for training the deep learning classifier. In an example, the classification of each of the plurality of components is performed by converting the image to a gray-scale image and drawing a rectangular boundary for each of the plurality of components upon the conversion. Further, probability of each of the plurality of components to be the textual component is determined. The probability of each of the plurality of components is compared with a predefined threshold to classify corresponding component to be one of the textual component or the non-textual component. The corresponding component may be classified to be the non-textual component when the probability is greater than the predefined threshold. The corresponding component may be classified to be the textual component when the probability is lesser than and equal to the predefined threshold. In an example, the predefined threshold may be of value '0.9'. When the probability determined for a component is greater than '0.9', such component is classified as the non-textual component. When the probability determined for a component is lesser than '0.9', such component is classified as the textual component.

Further, the text extraction system 101 is configured to identify at least one word element for textual components from the plurality of components based on segmentation of the plurality of components. The segmentation is performed by drawing a plurality of horizontal edge projections of a predefined length for each of the textual components. In an example, each of the plurality of horizontal edge projections is drawn from right edge of rectangular contour associated with corresponding textual component. In an example, the predefined length may be equal to an adaptive threshold associated with the image. The adaptive threshold is average of distance between rectangular contours of every sequential component from the plurality of components. The textual components may be identified to be associated with the at least one word element when horizontal edge projection of each of the textual components overlaps with adjacent textual component.

The text extraction system 101 is configured to provide the at least one word element as extracted text to the OCR module 104, for performing OCR on the engineering drawing 102.

Figure 2:
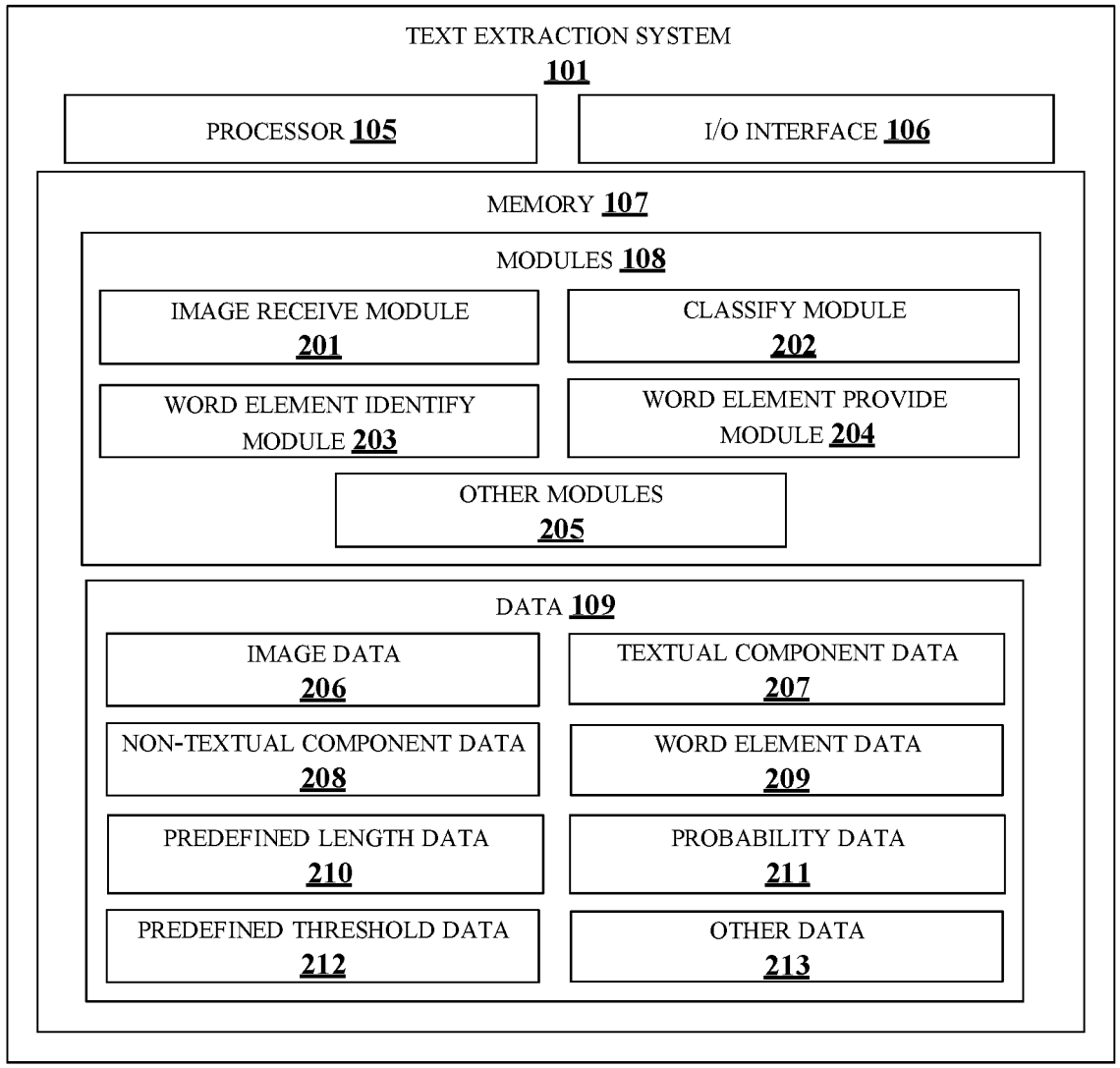
FIG. 2 shows a detailed block diagram of a text extraction system for extracting text from an engineering drawing for performing OCR, in accordance with some examples of the present disclosure.

FIG. 2 shows a detailed block diagram of the text extraction system 101 for extracting text from the engineering drawing 102 for performing OCR, in accordance with some examples of the present disclosure.

The data 109 and the one or more modules 108 in the memory 107 of the text extraction system 101 may be described herein in detail.

In one implementation, the one or more modules 108 may include, but are not limited to, an image receive module 201, a classify module 202, a word element identify module 203, a word element provide module 204 and one or more other modules 205, associated with the text extraction system 101.

In an example, the data 109 in the memory 107 may comprise image data 206 (also referred to as image 206), textual component data 207, non-textual component data 208, word element data 209 (also referred to as at least one word element 209), predefined length data 210 (also referred to as predefined length 210), probability data 211 (also referred to as probability 211), predefined threshold data 212 (also referred to as predefined threshold 212) and other data 213 associated with the text extraction system 101.

In an example, the data 109 in the memory 107 may be processed by the one or more modules 108 of the text extraction system 101. In an example, the one or more modules 108 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The image receive module 201 of the text extraction system 101, may be configured to receive the image 206 of the engineering drawing 102. In an example, the image receive module 201 may be configured to capture the image 206 of the engineering drawing 102. One or more techniques, known in the art, may be implemented for capturing the image 206 of the engineering drawing 102. In an example, the image receive module 201 may be coupled with an image capturing unit to capture the image 206 of the engineering drawing 102. The image receive module 201 may communicate with the image capturing unit to receive the image 206 of the engineering drawing 102. In an example, the image 206 may be a coloured image of the engineering drawing 102. In an example, the image 206 of the engineering drawing 102 includes plurality of components. The plurality of components may be include at least one of textual components and non-textual components. The textual components in the engineering drawing 102 may be any readable data with alphabets, and numbers. The non-textual components may be graphics or pictures relating to the engineering drawing 102. The non-textual components may also be referred to as graphical components.

Upon receiving the image 206, the classify module 202 of the text extraction system 101, configured to classify components in an image, may classify each of the plurality of components in the image 206 to be one of the textual component or the non-textual component. The plurality of components classified as the textual component may be stored as the textual component data 207. The plurality of components classified as the non-textual component may be stored as the non-textual component data 208. In an example, the classify module 202 may implement a deep learning classifier for performing the classification. The deep learning classifier may be trained using the plurality of predefined textual components and the plurality of predefined non-textual components. In an example, the plurality of predefined textual components and the plurality of predefined non-textual components may be fed by a user associated with the text extraction system 101. The deep learning classifier may be trained to determine the probability 211 of each of the plurality of components to be the textual component. One or more approaches, known to a person skilled in the art, may be used implemented to determine the probability 211. In an example, the image 206 that is to be provided to the deep learning classifier is converted to the gray-scale image. In an example, the classify module 202 may be configured to convert the image 206 to the gray-scale image. Further, the classify module 202 may be configured to draw a rectangular boundary for each of the plurality of components upon the conversion. In an example, drawing of the rectangular boundary may include identification of vertical lines and horizontal lines in the plurality of components. Further, the identified lines may be removed from the image 206, which is most likely to identified as the non-textual component. In an example, the vertical lines and the horizontal line may be removed using morphological transform. Remain components or characters are identified and the bounded with the rectangular boundary.

Figures 4A, 4B, 4C:
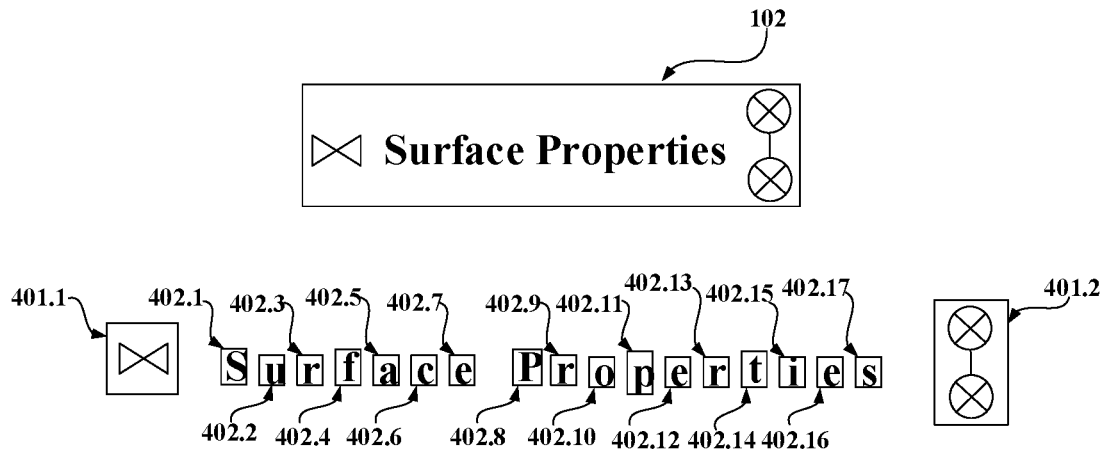
FIGS. 4a-4c illustrate exemplary examples for extracting text from an engineering drawing for performing OCR, in accordance with some examples of present disclosure.

The deep learning classifier identifies each of the plurality of components by respective rectangular boundary and determines the corresponding probability 211. For the classification, the probability 211 of each of the plurality of components is compared with the predefined threshold 212 to classify corresponding component to be one of the textual component or the non-textual component. The corresponding component is classified to be the non-textual component when the probability 211 is greater than the predefined threshold 212. The corresponding component is classified to be the textual component when the probability 211 is lesser than and equal to the predefined threshold 212. In an example, the predefined threshold 212 may be selected by the user. For example, consider the engineering drawing 102 illustrated in FIG. 1. By performing the classification on the image 206 of the engineering drawing 102 proposed in the present disclosure, each of the plurality of components in the engineering drawing 102 are classification to be one of the textual component or the non-textual component. As illustrated in FIG. 4*a*, the engineering drawing 102 includes the non-textual components 401.1 and 401.2, and the textual components 402.1 . . . 402.17. In an example, the non-textual components 401.1 and 401.2 may be removed from the image 206 and each of the textual components 402.1 . . . 402.17 may be bounded using rectangular contours. Based on the rectangular contours, each of the textual components 402.1 . . . 402.17 are further filtered and cropped to provide for identifying the at least one word element 209. By this, non-textual components which may be identified as the textual components may be eliminated.

Further, the word element identify module 203 of the text extraction system 101, may be configured to identify the at least one word element 209 for the textual components 402.1 . . . 402.17. The at least one word element 209 is identified based on segmentation of the plurality of components. The segmentation may be performed by drawing the plurality of horizontal edge projections of the predefined length 210 for each of the textual components. Each of the plurality of horizontal edge projections is drawn from right edge of rectangular contour associated with corresponding textual component. In an example the plurality of horizontal edge projections may be three in number as illustrated in FIG. 4*b*. The plurality of horizontal edge projections may be drawn from top, bottom and middle portion of the right edge as shown in the figures. One or more known approaches may be used for drawing the plurality of horizontal edge projections for the textual components 402.1 . . . 402.17. In an example, the predefined length 210 of the plurality of horizontal edge projections may be equal to the adaptive threshold associated with the image 206. In an example, the word element identify module 203 may be configured to compute the adaptive threshold for the received engineering drawing 102. The adaptive threshold is average of distance between rectangular contours of every sequential component from the plurality of components in the engineering drawing 102. The sequential components are the components that are adjacent to each other along an horizontal axis. In the illustrated engineering drawing 102, the sequential components are "S", "u", "r", "f", "a", "c", "e", "P", "r", "o", "p", "e", "r", "t", "i", "e" and "s". In an example, distances between said sequential components may be determined and average of the distances may be computed to output the adaptive threshold. Based on the computed adaptive threshold, the plurality of horizontal edge projections may be drawn for the textual components 402.1 . . . 402.17.

The word element identify module 203 is configured to identify each of the textual components 402.1 . . . 402.17 to be associated with the at least one-word element 209 when horizontal edge projection of each of the textual components overlaps with adjacent textual component. As illustrated in FIG. 4*c*, two-word elements 403.1 and 403.2 may be identified in the textual components 402.1 . . . 402.17. The horizontal edge projections associated with the components "S", "u", "r", "f", "a", "c" and "e" overlap with each other and the horizontal edge projection associated with component "e" does not overlap with component "P". Hence, components "S", "u", "r", "f", "a", "c" and "e" may be identified to be a word element "Surface". Further, the horizontal edge projections associated with components "P", "r", "o", "p", "e", "r", "t", "i", "e" and "s" overlay with each other. Hence, components "P", "r", "o", "p", "e", "r", "t", "i", "e" and "s" may be identified to be a new word element "Properties". In an example, if the horizontal edge projection associated with component "e" overlaps with component "P", then the word element may be identified to be "SurfaceProperties".

The word element provide module 204 of the text extraction system 101 may be configured to provide the word elements 403.1 and 403.2 as extracted text to the OCR module 104. In the illustrated examples, word elements are "Surface" and "Properties", or "SurfaceProperties". Upon receiving the word elements 403.1 and 403.2, the OCR module 104 may read text in the word elements 403.1 and 403.2 accurately.

The other data 213 may store data, including temporary data and temporary files, generated by modules for performing the various functions of the text extraction system 101. The one or more modules 108 may also include other modules 205 to perform various miscellaneous functionalities of the text extraction system 101. It will be appreciated that such modules may be represented as a single module or a combination of different modules.

Figure 3A:
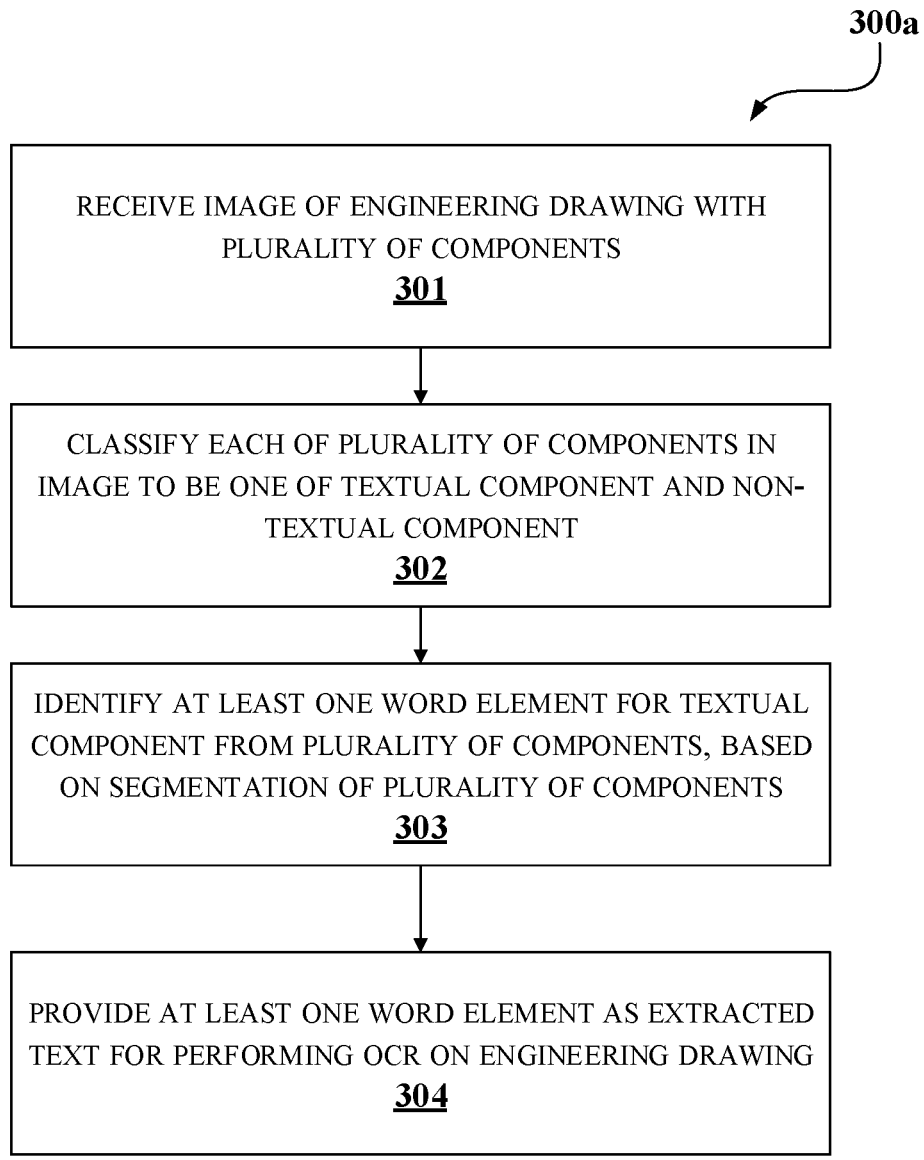
FIG. 3a illustrates a flowchart showing an exemplary method for extracting text from an engineering drawing for performing OCR, in accordance with some examples of present disclosure.

FIG. 3a illustrates a flowchart showing an exemplary method for extracting the text from the engineering drawing 102 for performing OCR, in accordance with some examples of present disclosure.

At block 301, the image receive module 201 may be configured to receive the image 206 of the engineering drawing 102 with the plurality of components. In an example, the image receive module 201 may be configured to capture the image 206 of the engineering drawing 102.

Figure 3B:
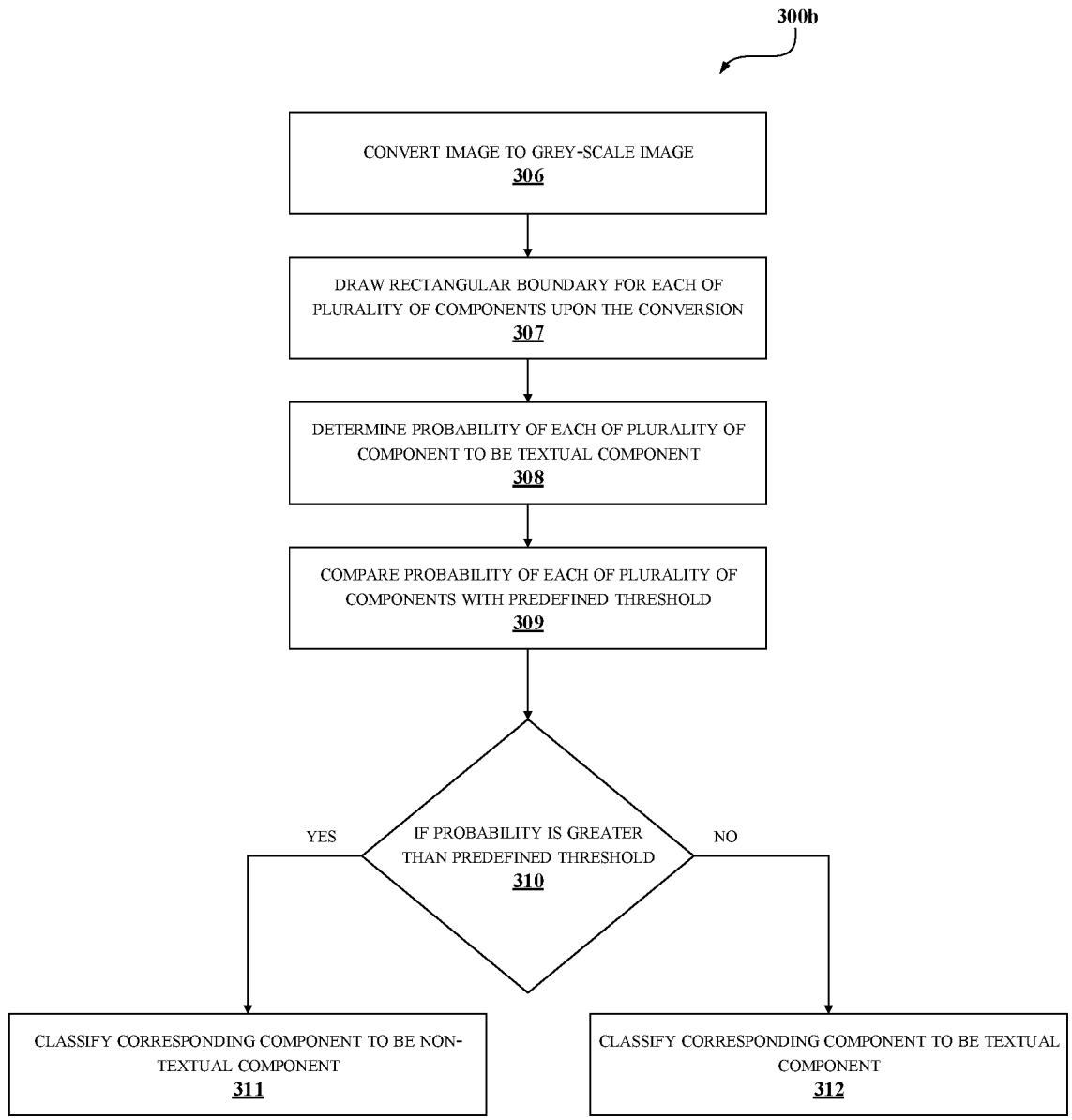
FIG. 3b illustrates a flowchart showing an exemplary method for classifying plurality of components to be one of textual component and non-textual component, in accordance with some examples of present disclosure.

At block 302 the classify module 202 may be configured to classify each of the plurality of components in the image 206 to be one of the textual component or the non-textual component. FIG. 3b illustrates a flowchart showing an exemplary method for classifying the plurality of components to be one of the textual component or the non-textual component.

At block 306, the classify module 202 may be configured to convert the image 206 to a gray scale image. One or more techniques, known to a person skilled in the art, may be implemented for the conversion.

At block 307, the classify module 202 may be configured to draw rectangular boundary for each of the plurality of components. The rectangular boundary may be drawing using contouring techniques.

At block 308, the classify module 202 may be configured to determine probability 211 of each of the plurality of components to be the textual component.

At block 309, the classify module 202 may be configured to compare the probability 211 of each of the plurality of components with the predefined threshold 212.

At block 310, the classify module 202 may be configured to check the probability 211 to be greater than the predefined threshold 212. Step in block 311 may be performed when the probability 211 is greater than the predefined threshold 212. Step in block 312 may be performed when the probability 211 is lesser greater than the predefined threshold 212.

At block 311, upon determining the probability 211 to be greater than the predefined threshold 212, the classify module 202 may be configured to classify corresponding component to be the non-textual component.

At block 312, upon determining the probability 211 to be lesser than the predefined threshold 212, the classify module 202 may be configured to classify corresponding component to be the textual component.

Figure 3C:
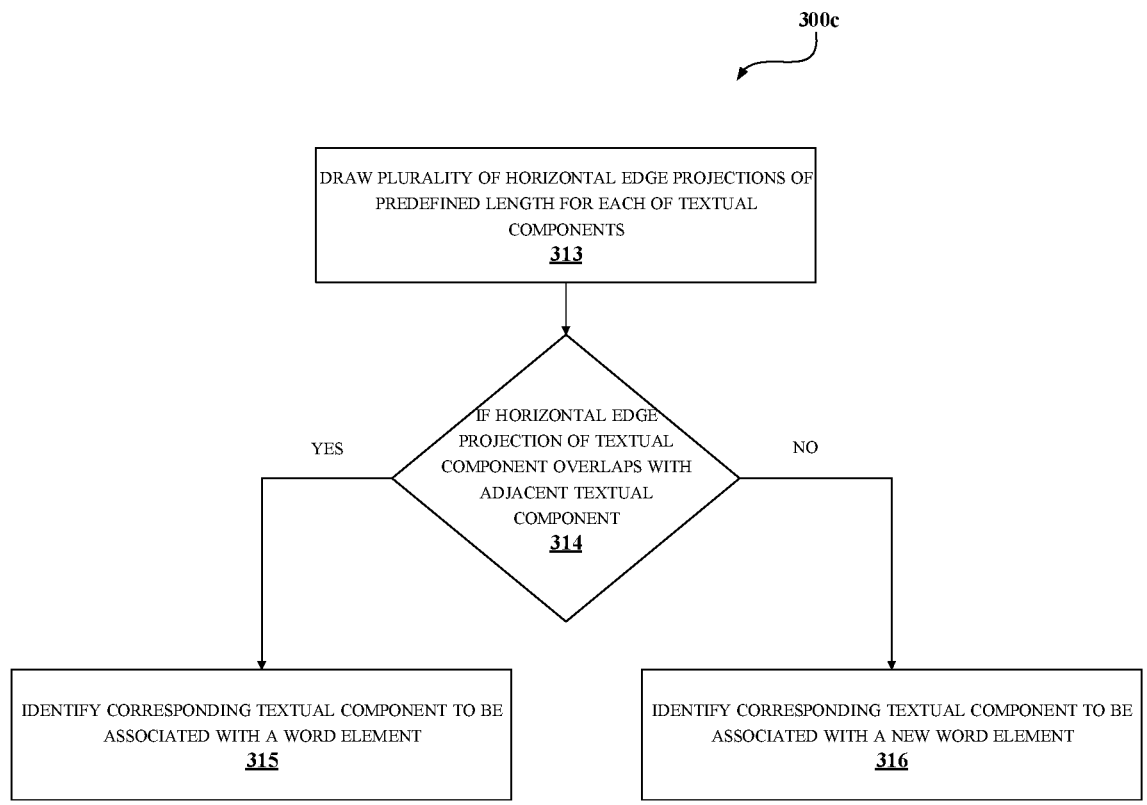
FIG. 3c illustrates a flowchart showing an exemplary method for segmenting textual components in an engineering drawing, in accordance with some examples of present disclosure.

Referring back to FIG. 3a, at block 303, the word element identify module 203 may be configured identify the at least one word element 209 for the textual components in the plurality of components. The identification is performed based on the segmentation. FIG. 3c illustrates a flowchart showing an exemplary method for segmenting the textual components in the engineering drawing 102.

At block 313, the word element identify module 203 may be configured to draw plurality of horizontal edge projections of the predefined length 210 for each of the textual components. Each of the plurality of horizontal edge projections may be drawn from right edge of rectangular contour associated with corresponding textual component. The predefined length 210 is equal to an adaptive threshold associated with the image 206. The adaptive threshold is average of distance between rectangular contours of every sequential components from the plurality of components At block 314, the word element identify module 203 may be configured to check for the plurality of horizontal edge projections to each of the plurality of textual components to be overlapping with adjacent textual components. Step in block 315 may be performed when the horizontal edge projection overlaps with the adjacent textual components. Step in block 316 may be performed when the horizontal edge projection does not overlap with the adjacent textual components.

At block 315, upon determining the horizontal edge projection to be overlapping with the adjacent textual components, the word element identify module 203 may be configured to identify the corresponding textual component to be associated with a word element.

At block 316, upon determining the horizontal edge projection to be not overlapping with the adjacent textual components, the word element identify module 203 may be configured to identify the corresponding textual component to be associated with a new word element.

Referring back to FIG. 3a, upon identifying the at least one word element 209, at block 304, the work element provide module 304 may be configured to provide the at least one word element 209 as extracted text for performing OCR on the engineering drawing 102.

As illustrated in FIGS. 3a, 3b and 3c, the methods 300a, 300b and 300c may include one or more blocks for executing processes in the text extraction system 101. The methods 300a, 300b and 300c may be described in the general context of computer executable instructions. Generally, computer executable instructions can include routines, programs, objects, components, data structures, procedures, modules, and functions, which perform particular functions or implement particular abstract data types.

The order in which the methods 300a, 300b and 300c are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 5:
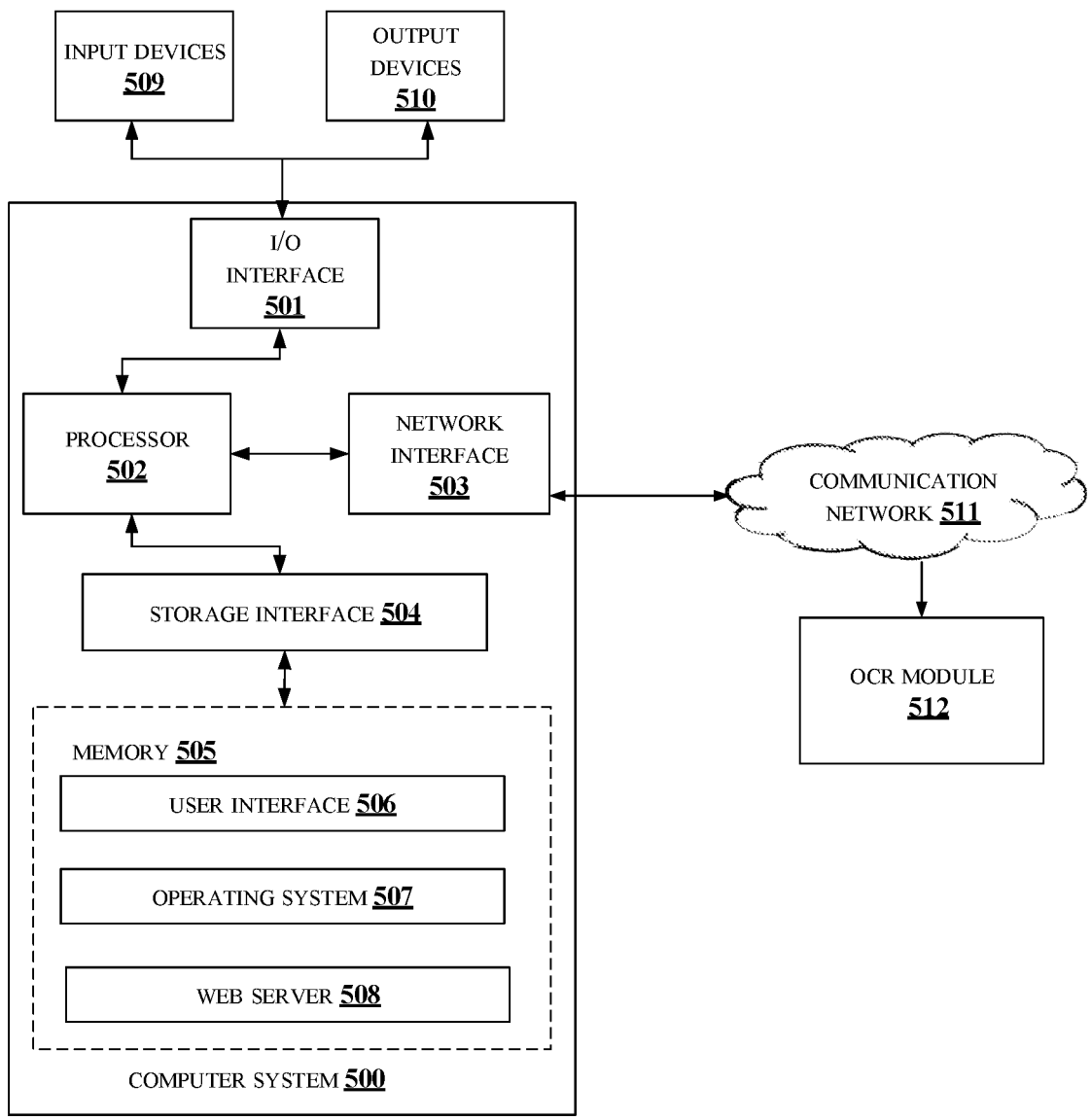
FIG. 5 illustrates a block diagram of an exemplary computer system for implementing examples consistent with the present disclosure.

FIG. 5 illustrates a block diagram of an exemplary computer system 500 for implementing examples consistent with the present disclosure. In an example, the computer system 500 is used to implement the text extraction system 101. The computer system 500 may include a central processing unit ("CPU" or "processor") 502. The processor 502 may include at least one data processor for executing processes in Virtual Storage Area Network. The processor 502 may include specialized processing units such as, integrated system (bus)

controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some examples, the computer system 500 may consist of the text extraction system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with a OCR module 512 for providing extracted text and performing OCR. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some examples, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some examples, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing examples consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the examples described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Examples of Advantages

An example of the present disclosure provision a pre-processing technique for inputting text for an OCR by which, noise in drawings that are to be read may be reduced. Also, by the pre-processing, large non-textual components, line, edge and so on, may be removed to improve accuracy of the OCR.

An example of the present disclosure include segmentation of textual components into chunks to avoid incorrect prediction of the word element.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described examples of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an example with several components in communication with each other does not imply that all such components are required. On the contrary a variety of optional components are described to illustrate the wide variety of possible examples of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other examples of the invention need not include the device itself.

The illustrated operations of FIGS. 3a, 3b and 3c show certain events occurring in a certain order. In alternative examples, certain operations may be performed in a different order, modified, or removed. Moreover, steps may be added to the above described logic and still conform to the described examples. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the examples of the invention is intended to be illustrative, but not limiting, of the scope of the invention, which is set forth in the following claims.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method to extract text from an engineering drawing for performing Optical Character Recognition (OCR), wherein the method comprises:
    receiving, by a text extraction system, an image of an engineering drawing comprising a plurality of components;
    classifying, by the text extraction system, each of the plurality of components in the image to be one of a textual component and a non-textual component;
    identifying, by the text extraction system, at least one word element for textual components from the plurality of components based on segmentation of the plurality of components, wherein the segmentation comprises:
        drawing a plurality of horizontal edge projections of a predefined length for each of the textual components; and
        identifying the textual components to be associated with the at least one word element when horizontal edge projection of each of the textual components overlaps with adjacent textual component; and
    providing, by the text extraction system, the at least one word element as extracted text for performing OCR on the engineering drawing.

2. The method as claimed in claim 1, wherein the classification of each of the plurality of components is performed using a deep learning classifier, wherein the deep learning classifier is trained using a plurality of predefined textual components and a plurality of predefined non-textual components.

3. The method as claimed in claim 1, wherein classifying of each of the plurality of components comprises:
    converting the image to a gray-scale image;
    drawing a rectangular boundary for each of the plurality of components upon the conversion; and
    determining probability of each of the plurality of components to be the textual component, wherein the probability is compared with a predefined threshold to classify the plurality of components to be one of the textual component or the non-textual component.

4. The method as claimed in claim 3, wherein a component from the plurality of components associated with the probability greater than the predefined threshold is classified to be the non-textual component and a component from the plurality of components associated with the probability one of lesser than and equal to the predefined threshold is classified to be the textual component.

5. The method as claimed in claim 1, wherein the predefined length is equal to an adaptive threshold associated with the image, wherein the adaptive threshold is average of distance between rectangular contours of every sequential components from the plurality of components.

6. The method as claimed in claim 1, wherein the each of the plurality of horizontal edge projections is drawn from right edge of a rectangular contour associated with corresponding textual component.

7. A text extraction system to extract text from an engineering drawing for performing Optical Character Recognition (OCR), comprises:
   a processor; and
   a memory communicatively coupled to the processor, wherein the memory stores processor-executable instructions, which, on execution, cause the processor to:
      receive an image of an engineering drawing comprising a plurality of components;
      classify each of the plurality of components in the image (206) to be one of a textual component and a non-textual component;
      identify at least one word element for textual components from the plurality of components based on segmentation of the plurality of components, wherein the segmentation comprises:
         draw a plurality of horizontal edge projections of a predefined length for each of the textual components; and
         identify the textual components to be associated with the at least one word element when horizontal edge projection of each of the textual components overlaps with adjacent textual component; and
      provide the at least one word element as extracted text for performing OCR on the engineering drawing.

8. The text extraction system as claimed in claim 7, wherein the classification of each of the plurality of components is performed using a deep learning classifier, wherein the deep learning classifier is trained using a plurality of predefined textual components and a plurality of predefined non-textual components.

9. The text extraction system as claimed in claim 7, wherein classifying of each of the plurality of components comprises:
   converting the image to a gray-scale image;
   drawing a rectangular boundary for each of the plurality of components upon the conversion; and
   determining probability of each of the plurality of components to be the textual component, wherein the probability is compared with a predefined threshold to classify the plurality of components to be one of the textual component or the non-textual component.

10. The text extraction system as claimed in claim 9, wherein a component from the plurality of components associated with the probability greater than the predefined threshold is classified to be the non-textual component and a component from the plurality of components associated with the probability one of lesser than and equal to the predefined threshold is classified to be the textual component.

11. The text extraction system as claimed in claim 7, wherein the predefined length is equal to an adaptive threshold associated with the image, wherein the adaptive threshold is average of distance between rectangular contours of every sequential components from the plurality of components.

12. The text extraction system as claimed in claim 7, wherein the each of the plurality of horizontal edge projections is drawn from right edge of a rectangular contour associated with corresponding textual component.

13. A non-transitory computer readable medium including instructions stored thereon that when processed by at least one processor cause a device to perform operations comprising:
   receiving an image of an engineering drawing comprising a plurality of components;
   classifying each of the plurality of components in the image to be one of a textual component and a non-textual component;
   identifying at least one word element for textual components from the plurality of components based on segmentation of the plurality of components, wherein the segmentation comprises:
      drawing a plurality of horizontal edge projections of a predefined length for each of the textual components; and
      identifying the textual components to be associated with the at least one word element when horizontal edge projection of each of the textual components overlaps with adjacent textual component; and
      providing the at least one word element as extracted text for performing OCR on the engineering drawing.

14. The medium as claimed in claim 13, wherein the classification of each of the plurality of components is performed using a deep learning classifier, wherein the deep learning classifier is trained using a plurality of predefined textual components and a plurality of predefined non-textual components.

15. The medium as claimed in claim 13, wherein classifying of each of the plurality of components comprises:
   converting the image to a gray-scale image;
   drawing a rectangular boundary for each of the plurality of components upon the conversion; and
   determining probability of each of the plurality of components to be the textual component, wherein the probability is compared with a predefined threshold to classify the plurality of components to be one of the textual component or the non-textual component.

16. The medium as claimed in claim 15, wherein a component from the plurality of components associated with the probability greater than the predefined threshold is classified to be the non-textual component and a component from the plurality of components associated with the probability one of lesser than and equal to the predefined threshold is classified to be the textual component.

17. The medium as claimed in claim 13, wherein the predefined length is equal to an adaptive threshold associated with the image, wherein the adaptive threshold is average of distance between rectangular contours of every sequential components from the plurality of components.

18. The medium as claimed in claim 13, wherein the each of the plurality of horizontal edge projections is drawn from right edge of a rectangular contour associated with corresponding textual component.

\* \* \* \* \*